United States Patent
Zhao et al.

(10) Patent No.: US 9,577,766 B2
(45) Date of Patent: Feb. 21, 2017

(54) GRID-CONTROLLED X-RAY SOURCE AND SPACE X-RAY COMMUNICATION SYSTEM AND METHOD

(75) Inventors: Baosheng Zhao, Shaanxi (CN); Qiurong Yan, Shaanxi (CN); Lizhi Sheng, Shaanxi (CN); Yongan Liu, Shaanxi (CN)

(73) Assignee: XI'AN INSTITUTE OF OPTICS AND PRECISION MECHANICS OF CAS, Shaanxi (CN)

(*) Notice: Subject to any disclaimer, the term of this patent is extended or adjusted under 35 U.S.C. 154(b) by 301 days.

(21) Appl. No.: 14/346,629

(22) PCT Filed: Dec. 26, 2011

(86) PCT No.: PCT/CN2011/084651
§ 371 (c)(1),
(2), (4) Date: Jun. 11, 2014

(87) PCT Pub. No.: WO2013/060076
PCT Pub. Date: May 2, 2013

(65) Prior Publication Data
US 2014/0314164 A1     Oct. 23, 2014

(30) Foreign Application Priority Data
Oct. 25, 2011   (CN) .......................... 2011 1 0327871

(51) Int. Cl.
*G01N 23/00*   (2006.01)
*H04B 10/90*   (2013.01)
(Continued)

(52) U.S. Cl.
CPC ............ *H04B 10/90* (2013.01); *H01J 31/49* (2013.01); *H01J 35/14* (2013.01); *H04B 10/118* (2013.01);
(Continued)

(58) Field of Classification Search
CPC ..................... H04B 10/90; H04B 10/1123
(Continued)

(56) References Cited

U.S. PATENT DOCUMENTS

2001/0002208 A1* 5/2001 Matsushita ............. H01J 35/06
378/138

FOREIGN PATENT DOCUMENTS

| CN | 1500368 A | 5/2004 |
| CN | 1608357 A | 4/2005 |
| CN | 102047443 A | 5/2011 |

OTHER PUBLICATIONS

International Search Report (Form PCT/ISA/210) for PCT/CN2011/084651, mailed Aug. 2, 2012.

* cited by examiner

*Primary Examiner* — Courtney Thomas
(74) *Attorney, Agent, or Firm* — Koppel, Patrick, Heybl & Philpott (57) ABSTRACT

The disclosure relates to a grid-controlled X-ray source, a space X-ray communication system and a space X-ray communication method. The structure of the grid-controlled X-ray source is: one end of the filament is grounded and the other end is connected with the anode of a power supply, the thermionic cathode is located at the side of the filament and the emergence hole thereof faces the filament, the modulation grid is an electrode plate with a small hole which faces the emergence hole of the thermionic cathode, the electronic beam focusing electrode is located on the two sides of the small hole of the modulation grid to form a focusing channel facing the small hole, an electronic beam is focused by the electronic beam focusing electrode and then transmitted to the metallic target anode, wherein the transmitting surface of the metallic target anode faces the outlet of the focusing channel and the other surface is connected with the anode of
(Continued)

the power supply, and the output window is located on an reflection path of the electronic beam which is from the metallic target anode. The disclosure solves the technical problems that the signal-to-noise ratio of communication is low, the error rate error rate of communication is high and the speed of communication is low when an X ray is used for implementing communication in the conventional art, and has the advantages of long communication distance and the low error rate of communication.

13 Claims, 6 Drawing Sheets

(51) Int. Cl.
    *H01J 31/49*     (2006.01)
    *H01J 35/14*     (2006.01)
    *H04B 10/112*     (2013.01)
    *H04B 10/118*     (2013.01)
    *H01J 35/04*     (2006.01)

(52) U.S. Cl.
    CPC .......... *H04B 10/1123* (2013.01); *H01J 35/045* (2013.01)

(58) Field of Classification Search
    USPC .................................................. 378/119, 121
    See application file for complete search history.

GRID-CONTROLLED X-RAY SOURCE AND SPACE X-RAY COMMUNICATION SYSTEM AND METHOD

FIELD OF THE INVENTION

The disclosure relates to the technical field of space communication, in particular to a modulating pulse source and the key technology thereof in space X-ray communication.

BACKGROUND OF THE INVENTION

With very short wavelength and strong penetration capacity, an X ray can achieve a penetration rate of 100% at an atmospheric pressure of less than $10^{-4}$ Pa when the photon energy of the X ray is more than 10 keV (namely, the wavelength of that is less than 0.12 nm), which is nearly unattenuated transmission. That is to say, a long-distance space communication can be implemented by a very small transmission power. In another scenario, a satellite needs to pass through a plasma zone in which the radio wave is completely shielded when returning to the earth, but in the plasma zone, and then the satellite can pass through the plasma zone by the X-ray communication. Therefore, compared with other communication ways, the X-ray communication has the advantages of low transmission power, long transmission distance, high confidentiality, freedom from electromagnetic interference in space environment and wide communication band, by which the real-time communication among space satellites in the future can be expected to be realized.

Figure 1:
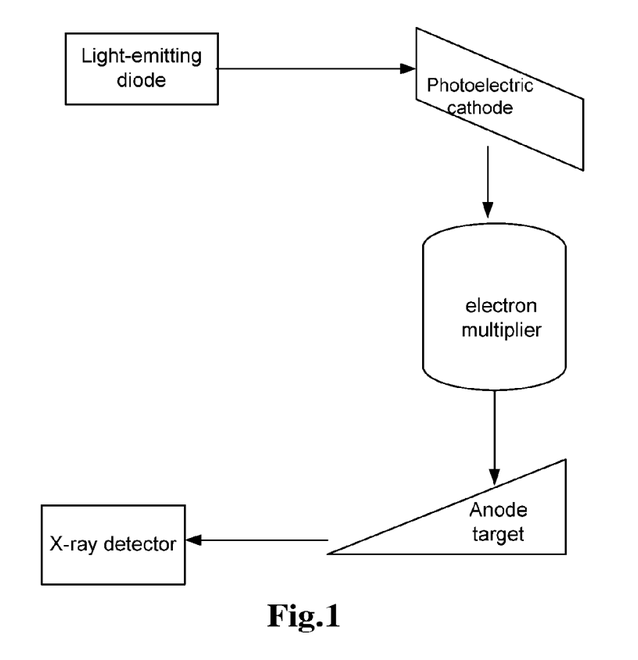
FIG. 1 is a schematic diagram showing the structure in the conventional art.

Dr. Keith Gendreau from Goddard Center Flight Center of America had proposed that a point-to-point communication among space satellite aircrafts could be realized by an X ray in 2007, and he also built an experimental facility of this proposal. As shown in FIG. 1, an Ultraviolet Light-Emitting Diode (UV-LED) is modulated at a transmitting end by a digital signal, and then the modulated ultraviolet light which is emitted by the UV-LED irradiates a "photoelectric emission X-ray tube", wherein the "photoelectric emission X-ray tube" consists of an ultraviolet photoelectric cathode, a Micro-channel Plate (MCP) and a metallic target anode. The photoelectric cathode receives ultraviolet light and converts it into photoelectrons, and the photoelectrons are multiplied by the MCP, and then are accelerated in anodic electric field (Va) to bombard a metallic target, so as to generate a modulated X-ray pulse. In a receiving end, the modulated X-ray pulse is converts into a modulated electric pulse by a Si-PIN photodiode sensitive to the X ray, and then the modulated electric pulse is filtered and is processed by a demodulation circuit to be reverted into a digital signal.

To sum up, obviously, the scheme of Dr. Keith Gendreau mainly has the following defects:

1) The signal-to-noise ratio of communication is low and the error rate of communication is high: The photoelectric emission current of the photoelectric cathode is direct ratio to the power of incident light, but the photoelectric cathode will be subject to damage in perpetuity if the power of the incident light increases to a certain value, so that the current (Ia) cannot be too large. Therefore, in the scheme of Dr. Keith Gendreau, the transmission power (Ia*Va) of the modulated X-ray pulse source cannot be very large, accordingly, the communication signal-to-noise ratio is low and the error rate is high.

2) the speed of communication is low: In the scheme of Dr. Keith Gendreau, since both of scattering and focusing for the X ray are all difficult to be realized, a large-area Si-PIN photoelectric diode is adopted to detect an X-ray pulse in order to implement long-distance communication. The large-area Si-PIN photoelectric diode utilizes internal photoelectric effect, and the time resolution is only the magnitude of millisecond, so the communication speed is limited. The disclosure is to provide a space X-ray communication scheme in order to overcome the defects above.

SUMMARY OF THE INVENTION

To solve the technical problems of low signal-to-noise ratio, high error rate and low communication speed in the conventional communication art implemented by an X ray, the disclosure provides a practical and feasible grid-controlled X-ray source, a space X-ray communication system and a space X-ray communication method.

The technical scheme of the disclosure is as follows:

A grid-controlled X-ray source is characterized by including an X-ray tube package 22 components located orderly in the X-ray tube package 22 and an output window 27 located on the X-ray tube package 22, wherein the components comprises a filament 21, a thermionic cathode 23, a modulation grid 24, an electronic beam focusing electrode 25 and a metallic target anode 26, wherein one end of the filament 21 is grounded and the other end is connected with the anode of a power supply, the thermionic cathode 23 is located at the side of the filament 21 and the emergence hole thereof faces the filament 21, the modulation grid 24 is an electrode plate with a small hole which faces the emergence hole of the thermionic cathode 23, the electronic beam focusing electrode 25 is located on the two sides of the small hole of the modulation grid 24 to form a focusing channel facing the small hole, an electronic beam is focused by the electronic beam focusing electrode 25 and then transmitted to the metallic target anode 26, wherein the transmitting surface of the metallic target anode 26 faces the outlet of the focusing channel and the other surface is connected with the anode of the power supply, and the output window 27 is located on an reflection path of the electronic beam which is from the metallic target anode 26.

A space X-ray communication system includes a transmitting apparatus and a receiving apparatus, wherein the transmitting apparatus comprises a digital signal transmitting source, a communication interface of a transmitting end, a carrier signal generator of the transmitting end, a modulator, a signal shaping circuit, a grid-controlled X-ray source and an X-ray collimator, wherein the digital signal transmitting source inputs a digital signal to be transmitted into the modulator through the communication interface of the transmitting end, the carrier signal generator of the transmitting end inputs a generated carrier signal of the transmitting end into the modulator, the modulator modulates the digital signal with the carrier signal of the transmitting end to generate a digital modulated signal and then inputs the digital modulated signal into the signal shaping circuit, the signal shaping circuit amplifies the digital modulated signal and performs the level conversion and then inputs the shaped signal into the input end of the grid-controlled X-ray source, the grid-controlled X-ray source outputs an X-ray pulse signal and the X-ray pulse signal is collimated by the X-ray collimator and then transmitted to the receiving apparatus;

the grid-controlled X-ray source comprises an X-ray tube package 22, components located orderly in the X-ray tube package 22 and an output window 27 located on the X-ray tube package 22, wherein the components comprises a filament 21, a thermionic cathode 23, a modulation grid 24, an electronic beam focusing electrode 25 and a metallic target anode 26;

wherein one end of the filament 21 is grounded and the other end is connected with the cathode of a power supply, the thermionic cathode 23 is located at the side of the filament 21 and the emergence hole thereof faces the filament 21, the modulation grid 24 is an electrode plate with a small hole which faces the emergence hole of the thermionic cathode 23, the electronic beam focusing electrode 25 is located on the two sides of the small hole of the modulation grid 24 to form a focusing channel facing the small hole, wherein the transmitting surface of the metallic target anode 26 faces the outlet of the focusing channel and the other surface is connected with the anode of the power supply, and the output window 27 is located on an reflection path of the electronic beam which is from the metallic target anode 26.

Preferably, the receiving apparatus includes an X-ray focusing lens, an X-ray detector, a pre-amplifier, a demodulator, a carrier signal generator of the receiving end, a communication interface of the receiving end and a digital signal receiving source;

wherein the X-ray focusing lens focuses an incident X-ray pulse signal to output a carrier modulated X-ray signal to the X-ray detector;

the X-ray detector converts the received carrier modulated X-ray signal into an electric signal and outputs the electric signal to the pre-amplifier, and then the pre-amplifier amplifies the electric signal and outputs the amplified electric signal to the demodulator; and the carrier signal generator of the receiving end inputs an outputted carrier signal of the receiving end into the demodulator, and then the demodulator demodulates a digital signal from the inputted carrier signal of the receiving end and the amplified electric signal according to the modulation mode of the modulator of the transmitting apparatus, and the digital signal is transmitted to the digital signal receiving source through the communication interface of the receiving end.

Preferably, the X-ray detector includes a detector shell, an input window 1 located on the detector shell and elements which is located orderly in the detector shell and comprises a photoelectric cathode 2, a Micro-channel Plate MCP 3, a collecting anode and a coaxial connector 5;

wherein the photoelectric cathode is located in one side of the MCP, the coaxial connector is located at the output end of the collecting anode, and a clearance is reserved between the input end of the collecting anode and the MCP.

Preferably, the collecting anode is a serpentine microstrip anode 41 or a 50 ohm impedance matching anode 42.

Preferably, the communication interface of the transmitting end and the communication interface of the receiving end are an RS232 interface, an RS485 interface, a USB2.0 interface, a Local Area Network LAN interface or a network port;

the modulation mode of the modulator is amplitude modulation, frequency modulation or phase modulation;

the demodulation mode of the demodulator is amplitude modulation, frequency modulation or phase modulation; and the diameter of the small hole of the modulation grid 24 is 0.1 mm-1 mm, the modulation grid 24 is 1 mm before the thermionic cathode 23, and the metallic target anode 26 is made of tantalum, molybdenum or tungsten.

A space X-ray communication method for the communication system is characterized by including:

1]: signal transmission:

1.1] the digital signal transmitting source inputting a digital signal to be transmitted into the modulator through the communication interface of the transmitting end;

1.2] the carrier signal generator of the transmitting end inputting the generated carrier signal of the transmitting end into the modulator;

1.3] the modulator modulating the digital signal and the carrier signal of the transmitting end to generate a digital modulated signal and then inputting the digital modulated signal into a signal shaping circuit;

1.4] the signal shaping circuit amplifying the digital modulated signal and performing the level conversion and then inputting the shaped signal into the grid-controlled X-ray source; and 1.5] the grid-controlled X-ray source outputting an X-ray pulse signal, and the X-ray pulse signal being collimated by the X-ray collimator and then being transmitted.

2]: signal reception:

2.1] an X-ray focusing lens focusing an incident X-ray pulse signal to generate a carrier modulated X-ray signal and outputting the carrier modulated X-ray signal to an X-ray detector;

2.2] the X-ray detector converting the received carrier modulated X-ray signal into an electric signal and outputting the electric signal to a preamplifier;

2.3] the preamplifier amplifying the electric signal and outputting the amplified electric signal to a demodulator, and a carrier signal generator of a receiving end generating a carrier signal of the transmitting end and inputting the generated carrier signal of the transmitting end into the demodulator, wherein a carrier signal of the receiving end is the same as the carrier signal of the transmitting end; and;

2.4] the demodulator demodulating a digital signal by processing the amplified electric signal and the carrier signal of the transmitting end according to the modulation mode of the modulator, and the digital signal being transmitted to a digital signal receiving source through a communication interface of the receiving end, wherein the demodulation mode of the demodulator corresponds to the modulation mode of the modulator.

Preferably, the grid-controlled X-ray source includes an X-ray tube package 22, components located orderly in the X-ray tube package 22 and an output window 27 located on the X-ray tube package 22, wherein the components comprises a filament 21, a thermionic cathode 23, a modulation grid 24, an electronic beam focusing electrode 25 and a metallic target anode 26;

wherein one end of the filament 21 is grounded and the other end is connected with the cathode of a power supply, the thermionic cathode 23 is located at the side of t the filament 21 and the emergence hole thereof faces the filament 21, the modulation grid 24 is an electrode plate with a small hole which faces the emergence hole of the thermionic cathode 23, the electronic beam focusing electrode 25 is located on the two sides of the small hole of the modulation grid 24 to form a focusing channel facing the small hole, an electronic beam is focused by the electronic beam focusing electrode 25 and then transmitted to the metallic target anode 26, wherein the transmitting surface of the metallic target anode 26 faces the outlet of the focusing channel and the other surface is connected with the anode of the power supply, and the output window 27 is located on an reflection path of the electronic beam which is from the metallic target anode 26.

Preferably, the X-ray detector includes a detector shell, an input window 1 located on the detector shell and elements which is located orderly in the detector shell and comprises a photoelectric cathode 2, an MCP 3, a collecting anode and a coaxial connector 5;

wherein the photoelectric cathode is located in one side of the MCP, the coaxial connector is located at the output end of the collecting anode, and a clearance is reserved between the input end of the collecting anode and the MCP.

Preferably, the communication interface of the transmitting end and the communication interface of the receiving end are an RS232 interface, an RS485 interface, a USB2.0 interface, an LAN interface or a network port;

the modulation mode of the modulator is amplitude modulation, frequency modulation or phase modulation; and the demodulation mode of the demodulator is amplitude modulation, frequency modulation or phase modulation.

Preferably, the space X-ray communication system mainly includes the transmitting apparatus for X-ray communication and the receiving apparatus for X-ray communication, wherein the X ray (more than 10 keV) is taken as a medium, namely, a communication channel, for information transmission. The transmitting end modulates a digital signal into a pulse sequence, and drives a grid-controlled X-ray tube to transmit the pulse sequence in the form of an X-ray optical pulse; the receiving end converts the received X-ray optical pulse into an electric signal by adopting a large-area high-time-resolution X-ray detector and performs shaping for the electric signal, such as amplifying and filtering, and then transmits the shaped electric signal to a demodulation circuit for demodulation, in order to restore into a binary digital signal to be output. The transmitting end adopts a grid-controlled X-ray tube which mainly includes a thermionic cathode for electron emission, a controlled grid, a focusing electrode and an anode. In the disclosure, a special grid and a special focusing electrode are designed based on the conventional X-ray tube. During communication, an X ray is modulated by modulating the voltage of the grid, the focusing electrode may implement electronic focusing to reduce time dispersion, thereby the large-power modulation and high-speed modulation of the X ray can be realized.

Preferably, the receiving end adopts a large-area high-time-resolution X-ray detector developed independently to detect the X-ray pulse from the transmitting end, so as to improve the speed of communication.

The disclosure has the following advantages:

1: The distance of communication is long. The grid-controlled X-ray tube to is adopted to modulate the X ray in the disclosure, wherein a grid-controlled electrode and a focusing electrode are added in the X ray tube, so the high-power modulation of the X ray can be implemented, and accordingly, the distance of communication is increased, e.g. the distance of communication is more than 4,000 kilometers.

2: The error rate of communication is low. The X ray is very weak during a long-distance communication because of scattering, so a high-sensitivity and large-area X-ray detector is adopted in the disclosure to improve the signal-to-noise and to reduce the error rate of communication.

3: The speed of communication is high. The X-ray detector adopted in the disclosure, which is an electric vacuum detector based on the MCP, utilizes external photoelectric effect which has a nanosecond response speed. However, the semiconductor detector adopted in the scheme of Dr. Keith Gendreau utilizes internal photoelectric effect which only has a millisecond magnitude response time. Therefore, the speed of communication in the disclosure may be very high.

4: The modulation method is much simpler. In the scheme of Dr. Keith Gendreau, firstly, the signal is modulated into an optical signal by an LED, secondly, the optical signal is modulated into an electric signal by a photocathode, and finally, the electric signal is modulated into an X ray. By the method of the disclosure, the electric signal is directly modulated into the X ray, therefore, one element of the scheme is saved, and the modulation method is rather simpler.

In the drawings: 21—filament, 22—X-ray tube package, 23—thermionic cathode, 24—modulation grid, 25—electronic beam focusing electrode, 26—metallic target anode, 27—output window, 1—input window, 2—photoelectric cathode, 3—MCP, 5—coaxial connector, 41—serpentine microstrip line anode, 42-50 ohm impedance matching anode.

DETAILED DESCRIPTION OF THE EMBODIMENTS

Figure 2:
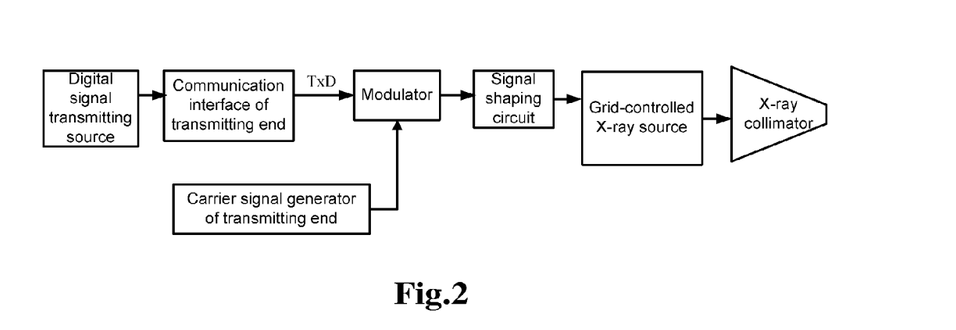
FIG. 2 is a schematic diagram showing the principle of a transmitting apparatus in the disclosure.

The disclosure discloses a space X-ray communication system, mainly including a transmitting apparatus and a receiving apparatus for X-ray communication, specifically as follows:

as shown in FIG. 2, the transmitting apparatus for X-ray communication is as follows:

an X-ray transmitter includes a digital signal transmitting source (a computer, a Single-Chip Microcomputer (SCM), a Field Programmable Gate Array (FPGA) or a Digital Signal Processor (DSP)), a communication interface of a transmitting end, a carrier signal generator of the transmitting end, a modulator, a signal shaping circuit, a grid-controlled X-ray source and an X-ray collimator; and the working principle is as follows: the digital signal transmitting source (the computer, the SCM, the FPGA or the DSP) inputs a digital signal to be transmitted into the modulator through the communication interface of the transmitting end (e.g., an RS232 interface, an RS485 interface, a USB2.0 interface, an LAN interface or a network port), the carrier signal generator of the transmitting end inputs a generated carrier signal of the transmitting end into the modulator (of which the modulation mode can be amplitude modulation, frequency modulation or phase modulation), the modulator inputs a digital modulated signal which is modulated from the carrier signal of the transmitting end and the digital signal into the signal shaping circuit, the signal shaping circuit processes the digital modulated signal, such as amplification and level conversion, to match the shaped signal with the input end of the grid-controlled X-ray source, namely, the digital modulated signal is inputted into the modulation grid 24 of the grid-controlled X-ray source after the digital modulated signal is shaped by the signal shaping circuit, such as amplification and level conversion, and the grid-controlled X-ray source outputs a modulated X-ray pulse, and the modulated X-ray pulse is collimated by the X-ray collimator and then is transmitted, wherein the objective of the collimation is to reduce the divergence angle of the X-ray pulse to implement long-distance communication.

Figure 3:
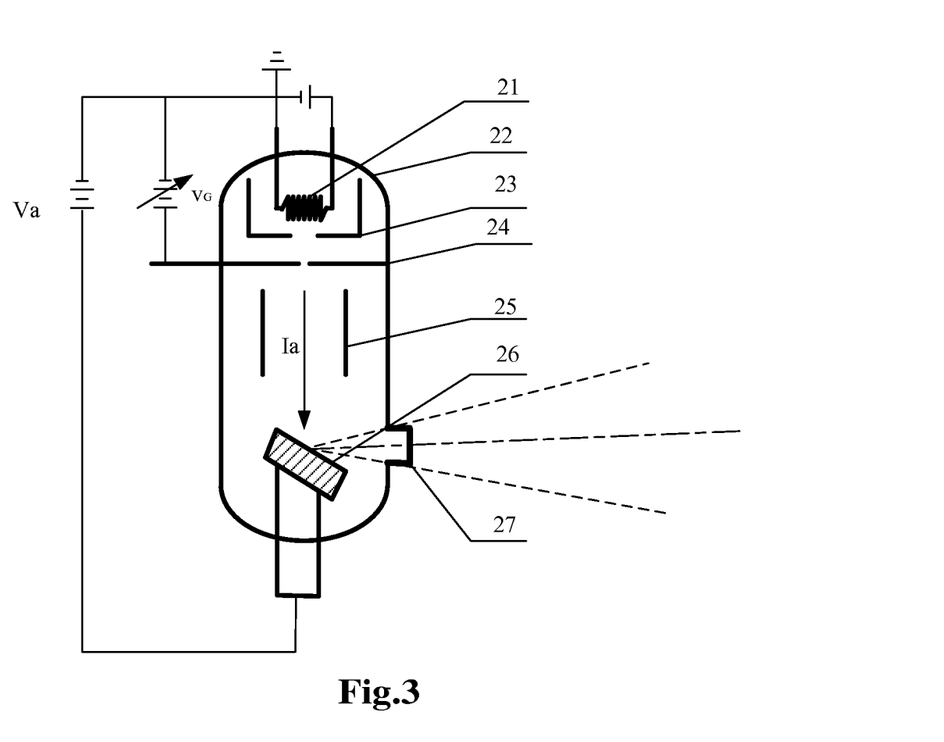
FIG. 3 is a schematic diagram showing the structure of a grid-controlled X-ray source in the disclosure.

As shown in FIG. 3, the grid-controlled X-ray source includes a filament 21, an X-ray tube package 22, a thermionic cathode 23, a modulation grid 24, an electronic beam focusing electrode 25, a metal target anode 26 and an output window 27. The modulation grid 24 and the electronic beam focusing electrode 25 are added based on the conventional X-ray tube. The modulation grid is an electrode plate with a small hole of which the diameter is 0.1 mm-1 mm, and is 1 mm before the thermionic cathode; and the center of the small hole faces the electron outlet of the thermionic cathode. The electronic beam focusing electrode is between the modulation grid and the metal target anode, and aims to implement electronic focusing by controlling the size of an electronic beam spot to make the electronic beam spot not deviate from the anode target after adding modulation voltage on the grid, therefore, the transmitting power is improved. The electronic beam focusing electrode further reduces the time dispersion of electrons, and improves the time resolution, which is more than 1 ns. The anode target is made of refractory metal, such as tantalum, molybdenum or tungsten.

Figure 4:
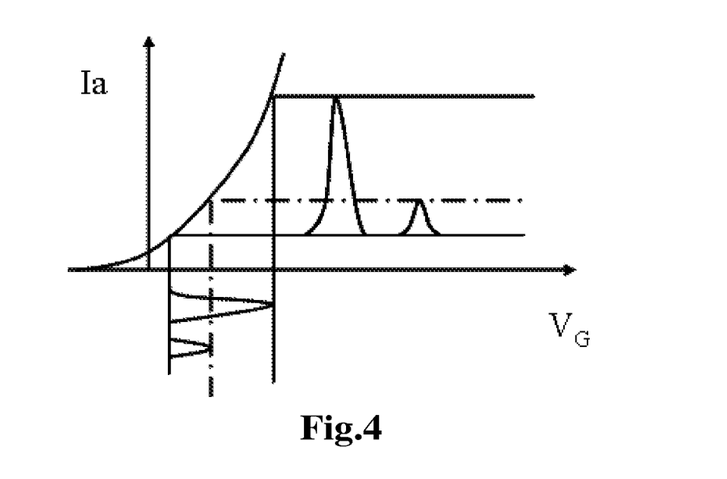
FIG. 4 is a schematic diagram showing the relationship between the anode current (Ia) and positive-negative voltage (Va) of a grid-controlled X-ray source in the disclosure.

As shown in FIG. 4, the power of the X ray outputted from the X-ray tube is proportional to the anode current (Ia); and the anode current (Ia) is proportional to the current of the thermionic cathode, therefore, when the heating current of the thermionic cathode is constant, the anode current (Ia) can be modulated by applying a modulation voltage $V_G$ to the grid, wherein the 3/2 power law relationship between Ia and $V_G$ is as follows:

$$Ia \propto V_G^{3/2}$$

The power of the outputted X ray is modulated by modulating the grid voltage $V_G$. The photon energy of the X ray is determined by the anode voltage (Va). To achieve a penetration rate of 100% in space of $10^{-4}$ Pa, the anode voltage Va is more than or equal to 20 kV.

Figure 5:
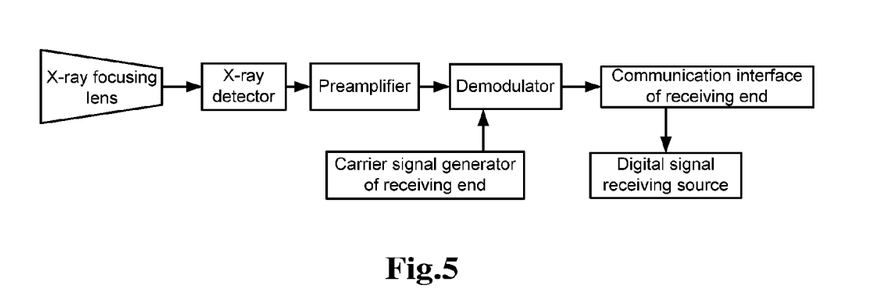
FIG. 5 is a schematic diagram showing the principle of a receiving apparatus in the disclosure.

As shown in FIG. 5, the receiving apparatus for an X ray includes an X-ray focusing lens, an X-ray detector, a preamplifier, a demodulator, a carrier signal generator of a receiving end, a communication interface of the receiving end and a digital signal receiving source (a computer, an SCM, an FPGA or a DSP).

The working principle is: the X-ray focusing lens focuses the incident X-ray pulse and then inputs it into the X-ray detector; and the X-ray detector converts the received carrier modulated X-ray signal into an electric signal; the electric signal outputted from the X-ray detector is amplified by the preamplifier, in order to improve the speed of communication, wherein the preamplifier adopts a high-time-resolution preamplifier sensitive to current; the signal outputted from the preamplifier is demodulated into a digital signal by the demodulator, wherein the carrier signal of the receiving end inputted into the demodulator is consistent with the carrier signal of the transmitting end, and the demodulation mode of the demodulator corresponds to the modulation mode of the modulator in the transmitting end (e.g., amplitude modulation, frequency modulation or phase modulation); and the digital signal outputted from the demodulator is inputted into a digital signal receiving source (the computer, the SCM, the FPGA or the DSP) through a communication interface (an RS232 interface, an RS485 interface, a USB2.0 interface, an LAN interface or a network port) and the like.

Figure 6:
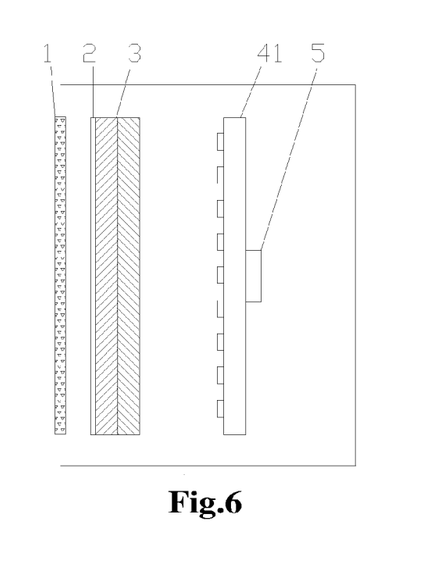
FIG. 6 is a schematic diagram showing one structure of an X-ray detector in the disclosure.

To improve the speed of communication, the X-ray detector of the disclosure adopts a large-area high-time-resolution X-ray detector. As shown in FIG. 6, a large-area high-time-resolution X-ray photoelectric detector based on a Microchannel Plate (MCP) mainly includes an incidence window 1, a photoelectric cathode 2, an MCP 3, a collecting anode and a coaxial connector 5. The collecting anode may be a serpentine microstrip anode 41 or a 50 ohm impedance matching anode 42.

The principle and working process of the disclosure are: an X-ray photon interacts with the photoelectric cathode 2 through the input window 1 to generate a photoelectron, and the photoelectron is multiplied in the MCP 3 under the action of high voltage electric field to form an electron cloud; the electron cloud is collected by the collecting anode to form an electronic pulse; the electronic pulse is outputted by the coaxial connector and then processed by a series of electronic recognition circuits (e.g., including a preamplifier sensitive to current, a constant fraction discriminator, a TDC and the like), so as to acquire the time information of the incident X-ray photon.

The role of the input window is to provide a vacuum environment for the detector and further to implement the penetration of a target X-ray photon. According to the waveband to be detected, different materials need to be selected for the input window. For example, for the X-ray pulsar radiation of which the energy spectrum is mainly focused on 1-10 keV, and "the penetrating rate of an X ray of 1-10 keV through a polyimide material is nearly 1" is disclosed in the document "The C1XSX-ray Spectrometer on Chandrayaan-1" from M. Grande, therefore, a polyimide material which is 25 μm thick is required to manufacture the input window of the detector.

The photon after through the input window will act on the photoelectric cathode to generate a photoelectron; and in order to ensure that the sensitivity of the X-ray detector is high enough; the photoelectric cathode of the X-ray detector is required to have a very high quantum efficiency. In the X-ray band, an alkali halide photoelectric cathode is a very efficient photoelectric conversion device. For example, for the X ray of which the photon energy is 1-10 keV, CsI is the most proper cathode material, of which the quantum efficiency is 100 times as high as that of Al photocathode and 30 times as high as that of Au photocathode.

Figure 7:
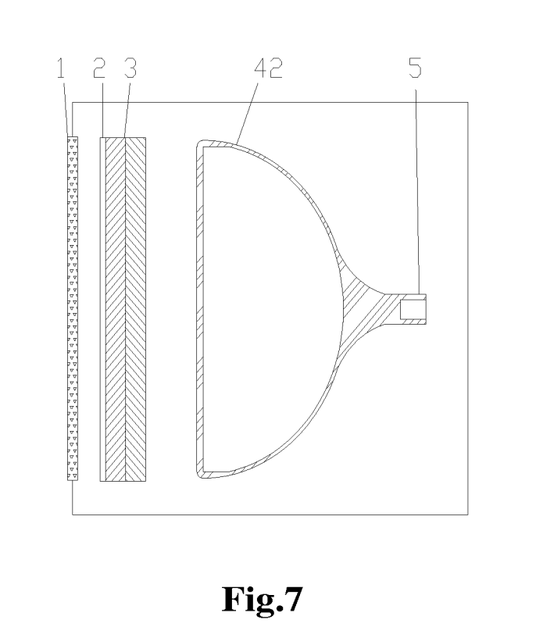
FIG. 7 is a schematic diagram showing another structure of an X-ray detector in the disclosure.

The electron cloud multiplied by the MCP is collected by the collecting anode, wherein the collecting anode includes a serpentine microstrip anode 41 and a 50 ohm impedance matching anode 42. FIG. 6 is a schematic diagram showing the structure of an X-ray detector adopting the serpentine microstrip anode and FIG. 7 is a schematic diagram showing the structure of an X-ray detector adopting the 50 ohm impedance matching anode.

Figure 8:
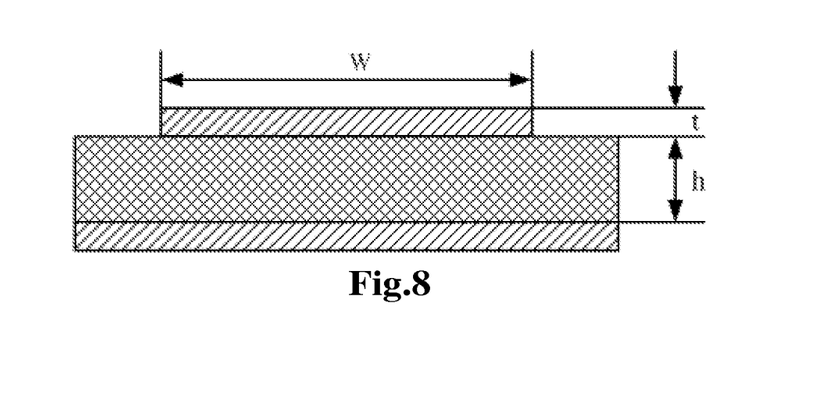
FIG. 8 is a sectional view of a serpentine microstrip line anode collector in the disclosure.
Figure 9:
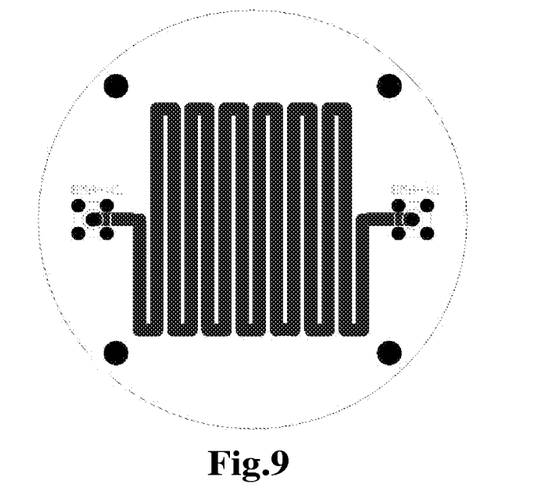
FIG. 9 is a front view of a serpentine microstrip line anode collector in the disclosure.
Figure 10:
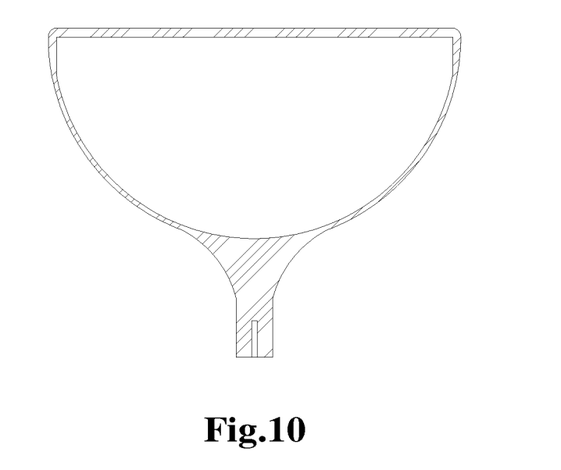
FIG. 10 is a sectional view of a 50 ohm impedance matching anode in the disclosure.
Figure 11:
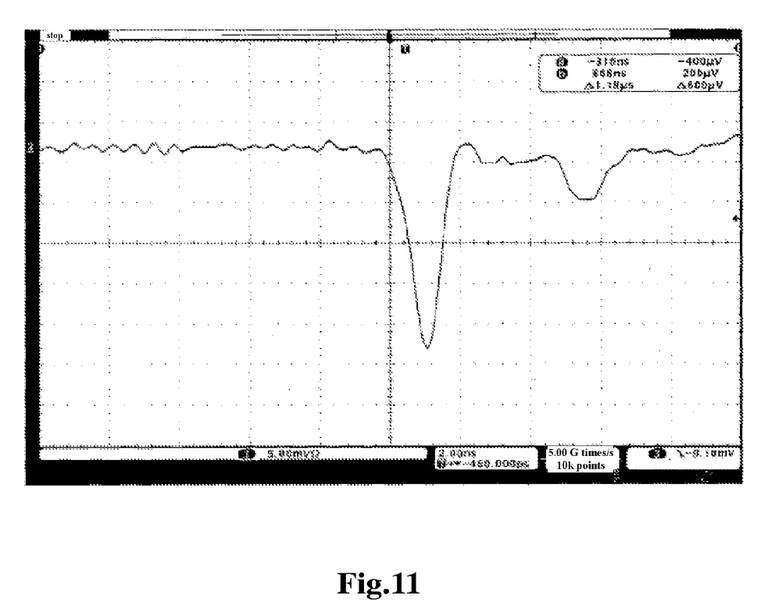
FIG. 11 is a waveform diagram showing an output signal of a serpentine microstrip line anode collector in the disclosure.

FIG. 8 is a sectional view of a serpentine microstrip line anode collector in the disclosure; FIG. 9 is a front view of a serpentine microstrip line anode collector in the disclosure; and FIG. 10 is a sectional view of a 50 ohm impedance matching anode in the disclosure.

The formula of calculating the characteristic impedance of the serpentine microstrip line anode is:

$$Z_0 = \frac{87}{\sqrt{\varepsilon_r + 1.41}} \ln \frac{5.89h}{0.8w + t} (\Omega)$$

wherein w is the width of a conductor, t is the thickness of the conductor, h is the thickness of a dielectric material, and $\in_r$ is a dielectric constant of the dielectric material. The most reasonable anode parameter can be determined according to the formula of calculating the characteristic impedance of a microstrip line; an insulating substrate (e.g., ceramic or quartz glass) is gilded by a micro-electronic planar process and a serpentine microstrip line electrode is obtained by photoetch. To manufacture an anode collector, it is necessary to plate a metal layer on a treated substrate (e.g., ceramic or quartz glass), then coat photoresist, expose it, and then perform some process technology for it, such as develop, rinse and etch it, strip the photoresist and the like, and finally, to form a required microstrip line anode pattern on the substrate.

There are certain requirements on the selection of the material of the microstrip line. Specially, the requirements on the dielectric are as follows: (1) high relative dielectric constant and small change on the dielectric constant over frequency; (2) small loss; (3) high purity, uniformity and isotropy of a medium; (4) good adhesion to a conductor; (5) good thermal conductivity; and (6) stable chemical properties. The requirements on the material of the conductor are as follows: (1) high electrical conductivity; (2) low temperature coefficient of a resistor; (3) good adhesion to a substrate and small thermal expansion coefficient; and (4) easiness in deposition and welding.

The formula of calculating the impedance of a coaxial transmission line is as follows:

$$Z_L = \sqrt{\frac{\mu_0}{\varepsilon_0}} \frac{1}{2\pi\sqrt{\varepsilon_r}} \log\left(\frac{D}{d}\right)(\Omega), \text{ wherein } \frac{1}{2\pi}\sqrt{\frac{\mu_0}{\varepsilon_0}} = 60\Omega,$$

wherein d is the inner diameter of the coaxial transmission line, D is the external diameter of the coaxial transmission line, $\in_r$ is a relative dielectric constant, $\in_0$ is a vacuum dielectric constant and $\mu_0$ is a vacuum magnetic permeability. As seen above, the impedance is only relative to the ratio between the internal and external diameters of the transmission line if the dielectric material is known. A 50 ohm impedance matching anode of which the impedance is matched with the impedance of the coaxial connector SMA can be designed according to the formula, with reference to FIG. 10.

The MCP 3 can work normally only at certain high voltage; the working voltage of a single MCP is generally 800V to 1,000V; and the anode collector must have certain electric potential relative to the output plane of the MCP 3, in order that the electron cloud from the MCP 3 can be normally collected by the anode. In the disclosure, two MCPs are cascaded in a chevron (v-like) shape, so that it is required that the normal working voltage of the MCPs should be 1,800V to 2,000V, the power voltage should be stable and the ripple coefficient should be small.

By changing the materials of the input window 1 and the photoelectric cathode 2, the detector can be developed into a detector for such particles as electrons, ions, charged particles and photons. Different variations can be made according to the design idea of the disclosure without the limitation of the detection scope disclosed herein, for example, electrons, ions, charged particles, photons and the like can be detected by adopting different input window materials and different photoelectric cathodes, wherein these variations are all within the scope of protection of the claims of the disclosure.

What is claimed is:

1. A space X-ray communication system, comprising a transmitting apparatus and a receiving apparatus, wherein
    the transmitting apparatus comprises a digital signal transmitting source, a communication interface of a transmitting end, a carrier signal generator of the transmitting end, a modulator, a signal shaping circuit, a grid-controlled X-ray source and an X-ray collimator, wherein the digital signal transmitting source inputs a digital signal to be transmitted into the modulator through the communication interface of the transmitting end, the carrier signal generator of the transmitting end inputs a generated carrier signal of the transmitting end into the modulator, the modulator modulates the digital signal with the carrier signal of the transmitting end to generate a digital modulated signal and then inputs the digital modulated signal into the signal shaping circuit, the signal shaping circuit amplifies the digital modulated signal and performs a level conversion and then inputs the shaped signal into the input end of the grid-controlled X-ray source, the grid-controlled X-ray source outputs an X-ray pulse signal and the X-ray pulse signal is collimated by the X-ray collimator and then transmitted to the receiving apparatus;
    the grid-controlled X-ray source comprises an X-ray tube package, components located orderly in the X-ray tube package and an output window located on the X-ray tube package, wherein the components comprises a filament, a thermionic cathode, a modulation grid, an electronic beam focusing electrode and a metallic target anode;
    wherein one end of the filament is grounded and the other end is connected with the anode of a power supply, the thermionic cathode is located at the side of the filament and the emergence hole thereof faces the filament, the modulation grid is an electrode plate with a small hole which faces the emergence hole of the thermionic cathode, the electronic beam focusing electrode is located on the two sides of the small hole of the modulation grid to form a focusing channel facing the small hole, an electronic beam is focused by the electronic beam focusing electrode and then transmitted to the metallic target anode, wherein the transmitting surface of the metallic target anode faces the outlet of the focusing channel and the other surface is connected with the anode of the power supply, and the output window is located on an reflection path of the electronic beam which is from the metallic target anode.

2. The space X-ray communication system according to claim 1, wherein the receiving apparatus comprises an X-ray focusing lens, an X-ray detector, a pre-amplifier, a demodulator, a carrier signal generator of the receiving end, a communication interface of the receiving end and a digital signal receiving source;

wherein the X-ray focusing lens focuses an incident X-ray pulse signal to output a carrier modulated X-ray signal to the X-ray detector;

the X-ray detector converts the received carrier modulated X-ray signal into an electric signal and outputs the electric signal to the pre-amplifier, and then the pre-amplifier amplifies the electric signal and outputs the amplified electric signal to the demodulator; and the carrier signal generator of the receiving end inputs an outputted carrier signal of the receiving end into the demodulator, and then the demodulator demodulates a digital signal from the inputted carrier signal of the receiving end and the amplified electric signal according to the modulation mode of the modulator of the transmitting apparatus, and the digital signal is transmitted to the digital signal receiving source through the communication interface of the receiving end.

3. The space X-ray communication system according to claim 2, wherein the X-ray detector comprises a detector shell, an input window located on the detector shell and elements which is located orderly in the detector shell and comprises a photoelectric cathode, a Micro channel Plate (MCP), a collecting anode and a coaxial connector;

wherein the photoelectric cathode is located in one side of the MCP, the coaxial connector is located at the output end of the collecting anode, and a clearance is reserved between the input end of the collecting anode and the MCP.

4. The space X-ray communication system according to claim 3, wherein the collecting anode is a serpentine microstrip anode or a 50 ohm impedance matching anode.

5. The space X-ray communication system according to claim 2, wherein the communication interface of the transmitting end and the communication interface of the receiving end are an RS232 interface, an RS485 interface, a USB2.0 interface, a Local Area Network (LAN) interface or a network port;

the modulation mode of the modulator is amplitude modulation, frequency modulation or phase modulation;

the demodulation mode of the demodulator is amplitude modulation, frequency modulation or phase modulation; and the diameter of the small hole of the modulation grid is 0.1 mm-1 mm, the modulation grid is 1 mm before the thermionic cathode, and the metallic target anode is made of tantalum, molybdenum or tungsten.

6. The space X-ray communication system according to claim 3, wherein the communication interface of the transmitting end and the communication interface of the receiving end are an RS232 interface, an RS485 interface, a USB2.0 interface, a Local Area Network (LAN) interface or a network port;

the modulation mode of the modulator is amplitude modulation, frequency modulation or phase modulation;

the demodulation mode of the demodulator is amplitude modulation, frequency modulation or phase modulation; and the diameter of the small hole of the modulation grid is 0.1 mm-1 mm, the modulation grid is 1 mm before the thermionic cathode, and the metallic target anode is made of tantalum, molybdenum or tungsten.

7. The space X-ray communication system according to claim 4, wherein the communication interface of the transmitting end and the communication interface of the receiving end are an RS232 interface, an RS485 interface, a USB2.0 interface, a Local Area Network (LAN) interface or a network port;

the modulation mode of the modulator is amplitude modulation, frequency modulation or phase modulation;

the demodulation mode of the demodulator is amplitude modulation, frequency modulation or phase modulation; and the diameter of the small hole of the modulation grid is 0.1 mm-1 mm, the modulation grid is 1 mm before the thermionic cathode, and the metallic target anode is made of tantalum, molybdenum or tungsten.

8. The space X-ray communication system according to claim 1, wherein the communication interface of the transmitting end and the communication interface of the receiving end are an RS232 interface, an RS485 interface, a USB2.0 interface, a Local Area Network (LAN) interface or a network port;

the modulation mode of the modulator is amplitude modulation, frequency modulation or phase modulation;

the demodulation mode of the demodulator is amplitude modulation, frequency modulation or phase modulation; and the diameter of the small hole of the modulation grid is 0.1 mm-1 mm, the modulation grid is 1 mm before the thermionic cathode, and the metallic target anode is made of tantalum, molybdenum or tungsten.

9. A space X-ray communication method for the communication system according to claim 1, comprising:

1]: signal transmission:

1.1] the digital signal transmitting source inputting a digital signal to be transmitted into the modulator through the communication interface of the transmitting end;

1.2] the carrier signal generator of the transmitting end inputting the generated carrier signal of the transmitting end into the modulator;

1.3] the modulator modulating the digital signal and the carrier signal of the transmitting end to generate a digital modulated signal and then inputting the digital modulated signal into a signal shaping circuit;

1.4] the signal shaping circuit amplifying the digital modulated signal and performing the level conversion and then inputting the shaped signal into the grid-controlled X-ray source; and 1.5] the grid-controlled X-ray source outputting an X-ray pulse signal, and the X-ray pulse signal being collimated by the X-ray collimator and then being transmitted.

2]: signal reception:

2.1] an X-ray focusing lens focusing an incident X-ray pulse signal to generate a carrier modulated X-ray signal and outputting the carrier modulated X-ray signal to an X-ray detector;

2.2] the X-ray detector converting the received carrier modulated X-ray signal into an electric signal and outputting the electric signal to a preamplifier;

2.3] the preamplifier amplifying the electric signal and outputting the amplified electric signal to a demodulator, and a carrier signal generator of a receiving end generating a carrier signal of the transmitting end and inputting the generated carrier signal of the transmitting end into the demodulator, wherein a carrier signal of the receiving end is the same as the carrier signal of the transmitting end; and;

2.4] the demodulator demodulating a digital signal by processing the amplified electric signal and the carrier signal of the transmitting end according to the modulation mode of the modulator, and the digital signal being transmitted to a digital signal receiving source through a communication interface of the receiving end, wherein the demodulation mode of the demodulator corresponds to the modulation mode of the modulator.

10. The space X-ray communication method according to claim 9, wherein the grid-controlled X-ray source comprises an X-ray tube package, components located orderly in the X-ray tube package and an output window located on the X-ray tube package, wherein the components comprises a filament, a thermionic cathode, a modulation grid, an electronic beam focusing electrode and a metallic target anode;

wherein one end of the filament is grounded and the other end is connected with the anode of a power supply, the thermionic cathode is located at the side of the filament and the emergence hole thereof faces the filament, the modulation grid is an electrode plate with a small hole which faces the emergence hole of the thermionic cathode, the electronic beam focusing electrode is located on the two sides of the small hole of the modulation grid to form a focusing channel facing the small hole, an electronic beam is focused by the electronic beam focusing electrode and then transmitted to the metallic target anode, wherein the transmitting surface of the metallic target anode faces the outlet of the focusing channel and the other surface is connected with the anode of the power supply, and the output window is located on an reflection path of the electronic beam which is from the metallic target anode.

11. The space X-ray communication method according to claim 10, wherein the X-ray detector comprises a detector shell, an input window located on the detector shell and elements which is located orderly in the detector shell and comprises a photoelectric cathode , an MCP, a collecting anode and a coaxial connector;

wherein the photoelectric cathode is located in one side of the MCP, the coaxial connector is located at the output end of the collecting anode, and a clearance is reserved between the input end of the collecting anode and the MCP.

12. The space X-ray communication method according to claim 9, wherein the X-ray detector comprises a detector shell, an input window located on the detector shell and elements which is located orderly in the detector shell and comprises a photoelectric cathode, an MCP, a collecting anode and a coaxial connector;

wherein the photoelectric cathode is located in one side of the MCP, the coaxial connector is located at the output end of the collecting anode, and a clearance is reserved between the input end of the collecting anode and the MCP.

13. The space X-ray communication method according to claim 12, wherein the communication interface of the transmitting end and the communication interface of the receiving end are an RS232 interface, an RS485 interface, a USB2.0 interface, an LAN interface or a network port;

the modulation mode of the modulator is amplitude modulation, frequency modulation or phase modulation; and the demodulation mode of the demodulator is amplitude modulation, frequency modulation or phase modulation.

* * * * *